United States Patent [19]

Chong et al.

[11] 4,151,332
[45] Apr. 24, 1979

[54] INERT INTERFACE BEADS OF A CROSSLINKED COPOLYMER OF METHYL METHACRYLATE AND HYDROXYALKYL METHACRYLATE FOR REGENERATION OF MIXED BED ION EXCHANGE COLUMNS

[75] Inventors: Berni P. Chong, Willow Grove; Robert R. Rowe, Warminster, both of Pa.

[73] Assignee: Rohm and Haas Company, Philadelphia, Pa.

[21] Appl. No.: 874,711

[22] Filed: Feb. 2, 1978

[51] Int. Cl.$^2$ ............................................. B01J 1/09
[52] U.S. Cl. ........................................ 521/28; 210/32
[58] Field of Search ........................... 210/32; 526/320; 260/2.1 M, 2.1 R; 521/28

[56] References Cited

U.S. PATENT DOCUMENTS

| | | | |
|---|---|---|---|
| 2,666,741 | 1/1954 | McMullen | 210/24 |
| 3,808,180 | 4/1974 | Owens | 260/885 |
| 3,957,741 | 5/1976 | Rembaum et al. | 526/320 |
| 4,631,037 | 6/1977 | Kalal et al. | 54/30 |

OTHER PUBLICATIONS

Chem. Abstracts, vol. 80, entry 71705w, Yamabe, et al.
Chem. Abstracts, vol. 83, entry 183394n.

*Primary Examiner*—Joseph L. Schofer
*Assistant Examiner*—Peter F. Kulkosky
*Attorney, Agent, or Firm*—John E. Taylor, III

[57] ABSTRACT

Beads of an inert, crosslinked copolymer of methyl methacrylate and hydroxyalkyl methacrylate are used as an interface separator during the regeneration of mixed-bed ion exchange columns; the beads have a settling rate intermediate between that of the cation and anion exchange resins of the mixed-bed system.

6 Claims, No Drawings

INERT INTERFACE BEADS OF A CROSSLINKED COPOLYMER OF METHYL METHACRYLATE AND HYDROXYALKYL METHACRYLATE FOR REGENERATION OF MIXED BED ION EXCHANGE COLUMNS

This invention relates to an inert separator material for use with mixed-bed ion exchange resins. More particularly, it relates to spheres or beads of a crosslinked copolymer of hydroxyalkyl methacrylate and methyl methacrylate which form a nonreactive zone separating the cation exchange resin from the anion exchange resin during regeneration of a mixed-bed resin.

Mixed-bed ion exchange resins are well-known to be simple mixtures of the beads of an anion exchange resin with those of a cation exchange resin. When water or another liquid containing dissolved salts flows through a mixed-bed resin, the cation exchange beads exchange hydrogen ions for dissolved cations in the liquid, and the anion exchange beads exchange hydroxyl ions for dissolved anions. This process normally continues until the available hydrogen or hydroxyl ions of the resins have all been exchanged, whereupon these ions must be replaced via the process known as regeneration.

Cation exchange resins are normally regenerated with aqueous solutions of acids, while anion exchange resins are normally regenerated with aqueous solutions of bases. Exposure of the cation resin to the cations of the anion resin regenerant, or of the anion resin to the anions of the cation resin regenerant, would effectively prevent or reverse regeneration, so the resins are typically segregated prior to regeneration. The cation and anion resins are selected with sufficiently different backwash flotation rates, resulting from their densities and bead diameters, that classification of the resin bed by passing water upward through it causes vertical segregation of the two resins within the ion exchange column. Regenerants are then caused to flow within their respective resins, between the top or bottom of the column and the interface of the cation resin with the anion resin.

It is well known to increase the thickness of this interface between the two resins by including a third, inert material in the mixed-bed resin composition, which during the ion exchange treatment process is intimately mixed with the ion exchange resins, but which, because of its backwash flotation rate intermediate between those of the cation resin and the anion resin, settles between these two resins during classification prior to regeneration. As disclosed by McMullen in U.S. Pat. No. 2,666,741, this separation of the cation resin from the anion resin allows placement of liquid inlets and outlets between them, reduces the chance of the regenerant for one resin working its way into the other resin, and allows for a reduction in bed size caused by attrition of the resins.

The spacer materials, to be useful, must be neutral with respect to ion exchange properties, that is, it must be ionically neutral, having neither acidic nor basic functional ion exchange sites, and it must have a backwash flotation rate intermediate between those of the anion and cation resins. For practical considerations it is helpful if the density of the spacer material approaches a value intermediate between the densities of the two ion exchange resins, so that its particle size and shape may be similar to that of the resins. The spacer material should be at least as physically stable as the ion exchange resins, so that shrinkage of the separation zone does not require addition of spacer material before replacement of the resins. The spacer material must also be resistant to attack by the influent stream and by the regenerants, which are usually solutions of strong acids and strong bases.

Materials which have been used by others as an inert spacer between the anion resins and cation resins during regeneration include beads or particles of polystyrene, polyvinyl chloride, polyethylene and hollow glass spheres. One problem that has been observed with such spacer material is a tendency for them to aggregate with particles of the anion exchange resin, so that the backwash flotation rate of both the resin and the spacer material is changed. When this occurs, backwashing fails to sharply classify the materials in the ion exchange bed, and the subsequent regeneration is less efficient and less complete. Accordingly, one object of the present invention is to provide a particulate spacer material for ion exchange resin beds which does not aggregate or clump with the anion exchange resin particles. Further objects will be apparent from the specification.

The present invention provides beads of a crosslinked copolymer of methyl methacrylate and a hydroxyalkyl methacrylate which are useful as separation material with mixed-bed ion exchange resins. These beads are prepared by suspension polymerization of a mixture comprising about 51 to about 94 weight percent methyl methacrylate, from about 5 to about 35 weight percent hydroxyalkyl methacrylate, and about 0.5 to about 12 weight percent crosslinker. The beads have a wet density of from about 1.14 to about 1.19 grams per cubic centimeter, they offer physical stability at least as good as that of commonly used ion exchange resins, they may be prepared in a wide range of particle sizes including 2 millimeters to 75 micrometers (USA Standard Series 10 to 200 mesh sieves), and they resist aggregation or clumping with anion exchange resins.

The crosslinker is a polyethylenically unsaturated monomer or a mixture of such monomers, which is neutral with regard to ion exchange functionality and which is hydrolytically stable. Examples of polyethylenically unsaturated monomers which may be used as crosslinkers in preparing the polymer beads of this invention include divinylbenzene, divinylnaphthalenes, divinylsulfone, ethylene glycol dimethacrylate, divinyl ketone, trivinylbenzene, trivinyl naphthalenes, and polyvinylanthracenes.

Preferred polyethylenically unsaturated monomers include divinylnaphthalene, divinylbenzene, trivinylbenzene, alkyldivinylbenzenes having from 1 to 4 alkyl groups of 1 or 2 carbon atoms substituted in the benzene nucleus, and alkyltrivinylbenzenes having 1 to 3 alkyl groups of 1 to 2 carbon atoms substituted in the benzene nucleus.

Since the reagents used are of good commercial quality, other unsaturated monomers may be present in the crosslinker monomers used. For example, the commercial product designated divinylbenzene contains approximately 50 to 60 weight percent of divinylbenzene, approximately 40 to 50 weight percent of ethylvinylbenzene, and smaller quantities of other, related compounds.

The hydroxyalkyl methacrylate monomers useful for preparing the polymer beads of the present invention include those with alkyl groups having from two to six carbon atoms, such as hydroxyethyl, hydroxypropyl, hydroxybutyl, hydroxypentyl and hydroxyhexyl methacrylates. The preferred hydroxyalkyl methacrylate is hydroxyethyl methacrylate.

The polymer beads of the present invention are prepared using conventional techniques of suspension polymerization; a standard suspension system and initiator are employed, an aqueous salt solution is used as the continuous phase, and the stirring rate is adjusted to control the particle size.

For use in a mixed-bed ion exchange column the polymer beads of the present invention are added to the mixed cation and anion exchange resins in an amount from about 5 to about 15 volume percent of the total ion exchange resin volume; the preferred amount is about 10 volume percent. The particle size of the polymer beads is chosen to give a backwash flow rate intermediate between that of the anion exchange resin and the cation exchange resin. The polymer beads are mixed with the ion exchange resins during the loading of the column. They separate to form the interface separator zone during backwashing, and are remixed with the ion exchange resins for the next cycle.

The resistance of the polymer beads of this invention to clumping or aggregation with anion exchange resins is thought to relate to the presence of the hydrophilic hydroxyalkyl methacrylate. The tendency of the polymer to swell because of the hydrophilic hydroxyl functionality is overcome by the larger amount of hydrophobic materials in the composition, and by the crosslinking provided by the polyethylenically unsaturated monomer. The required physical stability, resistance to chemical attack, and intermediate density of about 1.14 to 1.19 grams per cubic centimeter, are imparted by the major amount of methyl methacrylate in the polymer.

The following examples serve to illustrate but not limit the invention. All chemicals referred to are of good commercial quality. Particle sizes in the examples and elsewhere in the specification are referred to by sieve sizes described in ASTM Standard E 11-70 standard and alternative designations.

EXAMPLE 1

This example illustrates the preparation of the polymer beads of the present invention by suspension polymerization. An 8.8 gram amount of gelatin is dissolved in 300 grams of water. In a separate container 80 grams of poly(diallyldimethylammonium chloride), 0.64 grams of sodium nitrite, 2.08 grams of boric acid, and 1.44 grams of sodium hydroxide are dissolved in 500 grams of water. A 5-liter, round bottomed flask is fitted with a 4½-inch-diameter stirrer, the flask is charged with 347 grams of sodium chloride, 800 grams of water and the two solutions described above, and the mixture is stirred until the salt dissolves. A mixture of 1101.6 grams of methyl methacrylate, 320 grams of hydroxyethyl methacrylate, 96 grams of divinylbenzene and 82.4 grams of ethylvinylbenzene (present as an impurity in commercial divinylbenzene) is prepared in a separate container, and in this mixture 6.4 grams of lauroyl peroxide is dissolved. The mixture is added to the contents of the 5-liter flask, and the resulting, 2-phase mixture is stirred at 105 ppm to form a dispersion. The stirred dispersion is heated to 65° C. during a 1-hour period, held at 65° C. for one hour, heated to 68° C. during a 10-minute period, and held at 68° C. for approximately one half hour, until an exotherm is observed. The temperature is allowed to rise to approximately 70° C., and is controlled at 70°–71° C. for 18 minutes by external cooling and by addition of cold, 17 weight percent brine as required. The temperature is then allowed to rise uncontrolled for 15 minutes, after which the dispersion is heated to 85° C. and held at that temperature for 1 hour, steam stripped for two hours, cooled and filtered. The recovered beads are rinsed with water and air dried. The beads have a wet density of 1.17 grams per cubic centimeter and a solids content of 99–100 weight percent, and 75 weight percent of the beads are within a size range that passes a USA Standard Series 710 μm (25-mesh) sieve and is retained on a 425 μm (40-mesh) sieve.

EXAMPLE 2

This example illustrates the use of the beads prepared in Example 1 as a separator in a mixed-bed ion exchange column containing macroreticular strong base and strong acid ion exchange resins. A mixture of 337 milliliters of Amberlite* IRA-900 anion exchange resin in the chloride form, particle size passing USA Standard Series 850 μm (20-mesh) sieve and retained on 425 μm (40-mesh) sieve, 225 milliliters of Amberlite 200 cation exchange resin in the sodium form, particle size approximately retained on USA Standard Series 500 μm (35-mesh) sieve, and 56 milliliters of the polymer beads prepared in Example 1, screened to particle size passing USA Standard Series 710 μm (25-mesh) sieve and retained on 500 μm (35-mesh) sieve, is prepared in a 5-centimeter-diameter column. The mixture is treated with Acrysol* ASE-60 acrylic polymer thickener at a rate of 600 grams per cubic meter of mixture, agitated for one minute, backwashed to classify the bed and separate the components, and allowed to settle. The separation of the zones is examined visually. The three bead materials was mixed, classified and allowed to settle twice more. The visual examination of the classified bead columns shows excellent separation and sharply defined interfaces in each case.

*Registered Trademark of Rohm and Haas Company, Phila. Pa.

EXAMPLE 3

Example 2 is repeated, except that the 56 milliliters of beads from Example 1 are unscreened. Visual examination of the classified bead columns shows very good separation.

EXAMPLE 4

This example illustrates the use of the beads prepared in Example 1 as a separator in a mixed-bed ion exchange column containing gel, strong base and strong acid ion exchange resins. A mixture of 337 milliliters of Amberlite* IRA-400 anion exchange resin in the chloride form, unscreened, 225 milliliters of Amberlite IR-120 cation exchange resin in the sodium form, unscreened, and 56 milliliters of the beads prepared in Example 1, screened to a particle size passing USA Standard Series 850 μm (20-mesh) sieve and retained on 710 μm (25-mesh) sieve is prepared in a 5-centimeter-diameter column and treated according to the procedure described in Example 2. The mixing, classification and settling are repeated fifteen times. Visual examination of the bead column shows clean separations in each case.

*Registered Trademark of Rohm and Haas Company, Phila. Pa.

EXAMPLE 5

The following example illustrates the stability of the separator beads in the presence of typical regenerant solutions. The total wet solids content of the polymer beads of Example 1 is determined to be 87.9 weight percent. The beads are exposed to the following weight percentages of aqueous regenerant solutions for 73 days at 50° C. and the wet solids content after exposure is determined:

| SOLUTION | WET SOLIDS CONTENT |
|---|---|
| 4% NaOH | 89.0% |
| 16% NaOH | 90.4% |
| 6% $H_2SO_4$ | 89.1% |
| 10% HCl | 90.5% |
| pure water | 88.5% |

No measurable hydrolysis is observed.

EXAMPLE 6

This example illustrates the low solvent extractibles content of the separator beads. Separate samples of the polymer beads of Example 1 are continuously extracted for 24 hours in Soxhlet extractors. The first sample is extracted with methanol; the non-volatile extractibles content, determined from the weight of the residue from the evaporated solvent, is 1.5±0.05 weight percent. The second sample is extracted with water; the non-volatile extractibles content is less than 0.05 weight percent.

EXAMPLE 7

This example illustrates the preparation of polymer beads of the present invention having a different composition from those of Example 1. The procedure of Example 1 is repeated, except that the monomer percentages (by weight) are changed from 68.85% methyl methacrylate, 20.0% hydroxyethyl methacrylate, 6.0% divinylbenzene and 5.15% ethylvinylbenzene of Example 1 to 91.3% methyl methacrylate, 5.0% hydroxyethyl methacrylate, 2.0% divinylbenzene and 1.7% ethylvinylbenzene.

EXAMPLE 8

This example illustrates another composition variation of the polymer beads of the present invention. The procedure of Example 1 is repeated, except that the monomer percentages (by weight) are 82.6% methyl methacrylate, 10.0% hydroxyethyl methacrylate, 4.0% divinylbenzene and 3.4% ethylvinylbenzene.

We claim:

1. A mixed-bed ion exchange resin composition comprising:
   particles of an anion exchange resin,
   particles of a cation exchange resin, and
   from about 5 to about 15 volume percent of spherical, non-aggregating, hydrolytically stable, ionically neutral polymer beads having a backwash flow rate intermediate between that of the anion exchange resin particles and the cation exchange resin particles, the beads being derived from a copolymer of from about 51 to about 94 weight percent methyl methacrylate from about 5 to about 35 weight percent hydroxyalkyl methacrylate, the alkyl group having from two to six carbon atoms, and from about 0.5 to about 12 weight percent of ionically neutral, hydrolytically stable, polyethylenically unsaturated crosslinker.

2. The mixed-bed ion exchange resin composition of claim 1 wherein the anion exchange resin is a strongly basic resin and the cation exchange resin is a strongly acidic resin.

3. The mixed-bed ion exchange resin composition of claim 1 wherein the anion exchange resin is a weakly basic resin and the cation exchange resin is a weakly acidic resin.

4. The mixed-bed ion exchange resin composition of claim 1 wherein the anion exchange resin is a strongly basic resin and the cation exchange resin is a weakly acidic resin.

5. The mixed-bed ion exchange resin composition of claim 1 wherein the anion exchange resin is a weakly basic resin and the cation exchange resin is a strongly acidic resin.

6. The mixed-bed ion exchange resin composition of claim 1 wherein the hyroxyalkyl methacrylate of the copolymer is hydroxyethyl methacrylate, and the crosslinker of the copolymer is divinylbenzene.

* * * * *